MAGAZINE TYPE HAND TOOL FOR CRIMPING ELECTRICAL CONNECTORS
Original Filed April 22, 1953 6 Sheets-Sheet 1
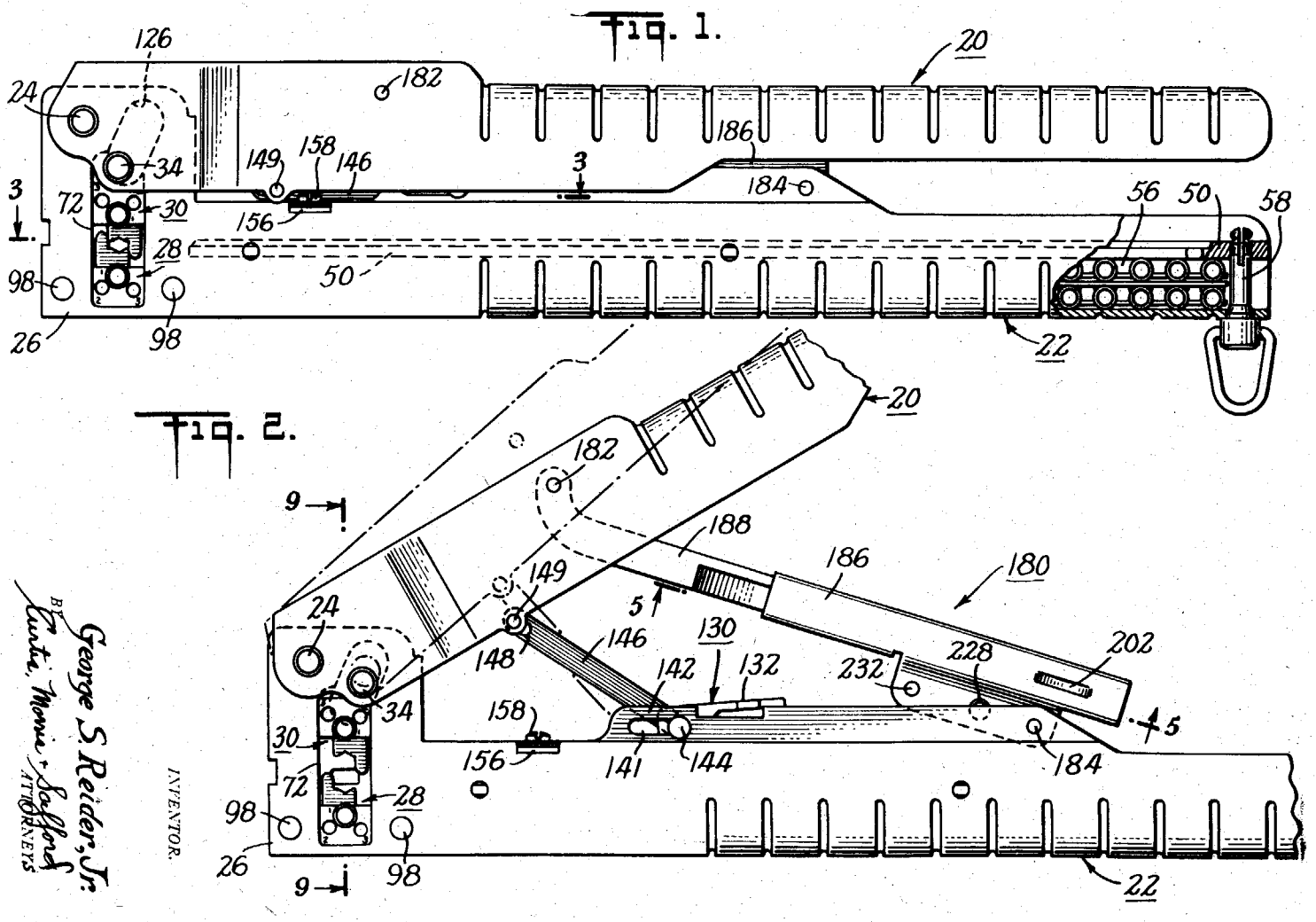
INVENTOR.
George S. Reider, Jr.
BY Curtis, Morris & Safford
ATTORNEYS

MAGAZINE TYPE HAND TOOL FOR CRIMPING ELECTRICAL CONNECTORS

Original Filed April 22, 1953 6 Sheets-Sheet 2

MAGAZINE TYPE HAND TOOL FOR CRIMPING ELECTRICAL CONNECTORS

Original Filed April 22, 1953 6 Sheets-Sheet 3

INVENTOR.

George S. Reider, Jr.

BY Curtis, Morris & Safford

ATTORNEYS

MAGAZINE TYPE HAND TOOL FOR CRIMPING ELECTRICAL CONNECTORS
Original Filed April 22, 1953 6 Sheets-Sheet 4
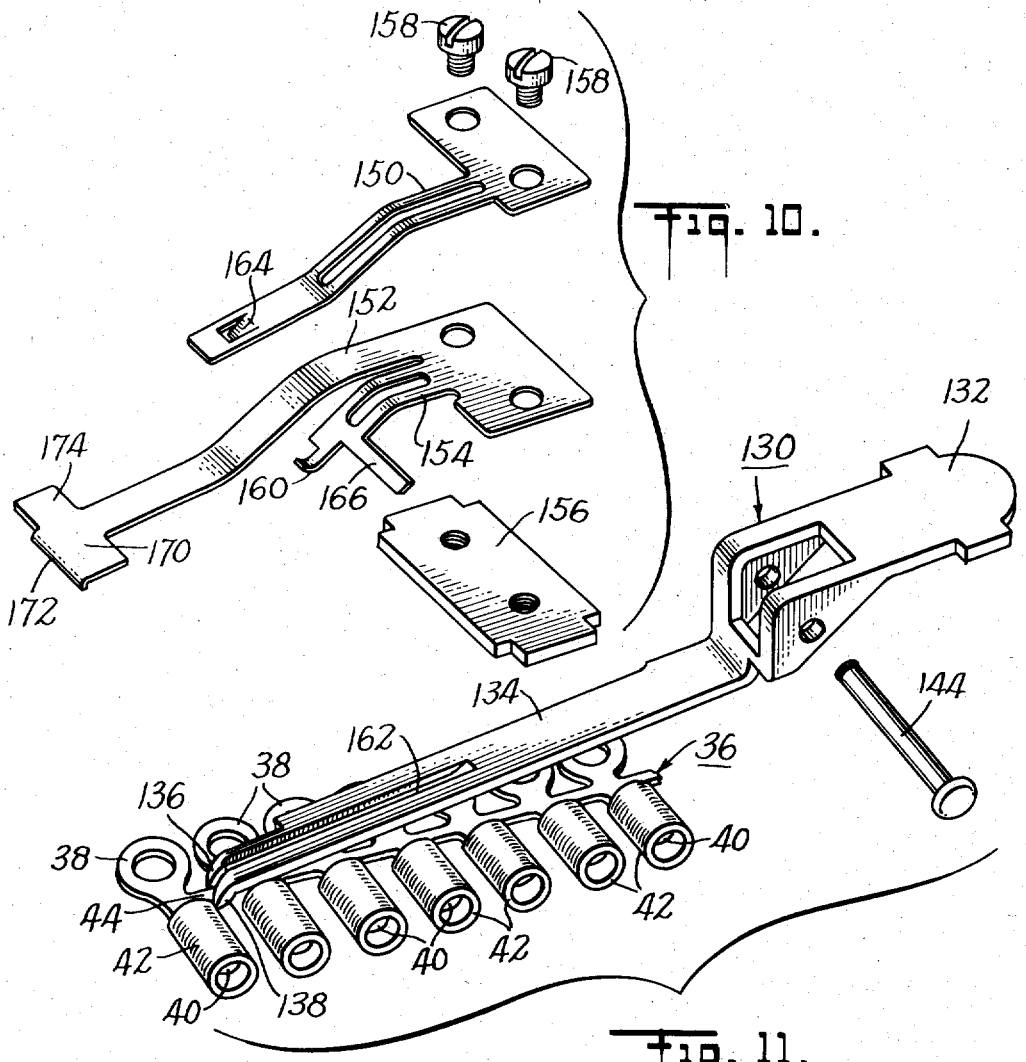
Fig. 10.
Fig. 11.
Fig. 12.
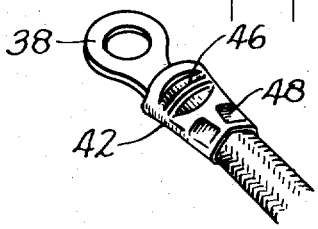
INVENTOR.
George S. Reider, Jr.
BY Curtis, Morris & Safford
ATTORNEYS MAGAZINE TYPE HAND TOOL FOR CRIMPING ELECTRICAL CONNECTORS
Original Filed April 22, 1953 6 Sheets-Sheet 5
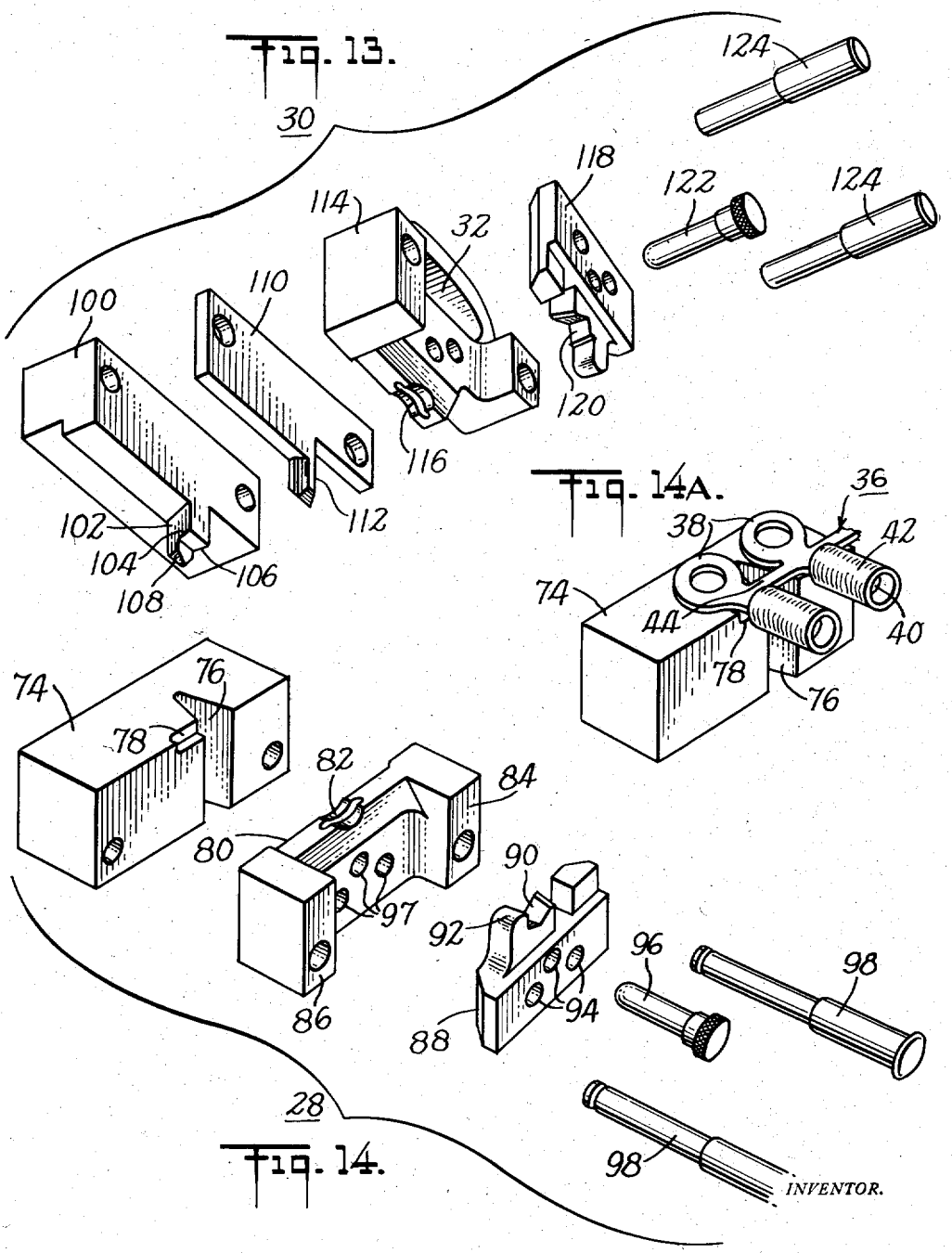
INVENTOR.
George S. Reider, Jr.
BY Curtis, Morris & Safford
ATTORNEYS

MAGAZINE TYPE HAND TOOL FOR CRIMPING ELECTRICAL CONNECTORS

Original Filed April 22, 1953 6 Sheets-Sheet 6

INVENTOR.

George S. Reider, Jr.

BY Curtis, Morris & Safford

ATTORNEYS

United States Patent Office

Re. 24,604
Reissued Feb. 17, 1959

24,604

MAGAZINE TYPE HAND TOOL FOR CRIMPING ELECTRICAL CONNECTORS

George S. Reider, Jr., Highspire, Pa., assignor to AMP Incorporated, a corporation of New Jersey Original No. 2,777,345, dated January 15, 1957, Serial No. 350,338, April 22, 1953. Application for reissue January 10, 1958, Serial No. 708,738

19 Claims. (Cl. 81—15)

Matter enclosed in heavy brackets [ ] appears in the original patent but forms no part of this reissue specification; matter printed in italics indicates the additions made by reissue.

This invention relates to hand tools for crimping electrical connectors on conductors and more particularly to a hand tool of the type wherein connectors or terminals in strip form are successively and automatically fed to and properly positioned between crimping jaws for crimping.

The present invention is particularly concerned with magazine-type crimping tools that are manually operated without the use of any auxiliary source of power, and the construction of such a tool presents a number of special problems. Thus the amount of power available for operating the feeding and crimping mechanisms of the tool is quite limited, and it is essential that a considerable mechanical advantage be built into the tool to convert the relatively small manually applied force into the relatively high crimping pressures required for proper crimping. It is also desirable that the tool incorporate a means for positively ensuring complete crimping so that incomplete crimps will not be formed because of the failure of the operator to apply a sufficient manual force in operating the tool. The tool should desirably incorporate positive feeding and positioning mechanisms and these mechanisms as well as other parts of the tool must be sufficiently light in weight so that the resulting tool can be readily carried and handled by the operator.

It is accordingly an object of the present invention to provide an improved crimping tool capable of satisfying the various requirements outlined above. It is another object of the invention to provide a hand crimping tool wherein connectors or terminals in strip form are positively fed in succession to a crimping position for crimping. It is another object of the invention to provide a hand tool of this type incorporating relatively light-weight mechanisms for accurately locating a connector in crimping position and severing it from the feed strip. It is still another object of the invention to provide a hand tool having an improved structure for converting manually applied force into crimping pressure. It is a still further object of the invention to provide a hand tool structure wherein once a connector or terminal has been fed to crimping position it cannot be removed from the tool until it has been fully crimped. Other objects of the invention will be in part obvious and in part pointed out hereafter.

The many objects and advantages of the present invention can best be understood and appreciated by reference to the accompanying drawings which disclose a hand tool incorporating a preferred embodiment of the invention and wherein:

Figure 1 is a side elevation of the hand tool with the handles in the position they occupy when a terminal has been crimped;

Figure 2 is a side elevation similar to Figure 1 but showing the handles in both partly open and fully open positions;

Figure 10 is an exploded perspective view of the detent spring and hold-down spring assembly;

Figure 11 is a perspective view of the feed arm showing the manner in which it cooperates with the strip of terminals to be fed;

Figure 12 is a perspective view of a terminal crimped on the end of a conductor;

Figure 13 is an exploded bottom perspective view of the upper crimping jaw assembly showing the upper crimping dies and terminal-positioning and severing mechanism;

Figure 14 is a top perspective view of the lower crimping jaw assembly showing the lower crimping dies and the anvil on which the terminal is positioned during crimping;

Figure 14a is a perspective view of the anvil as shown in Figure 14 but with the leading end of a strip of terminals positioned thereon;

Figure 15A:
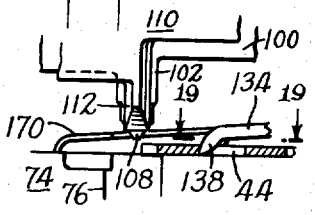
Figure 15a is a fragmentary section taken at plane "A" of Figure 9 and showing the feed fingers and terminal-positioning mechanism when the tool is in half-open position, i. e. in the full line position of Figure 2.
Figure 15B:
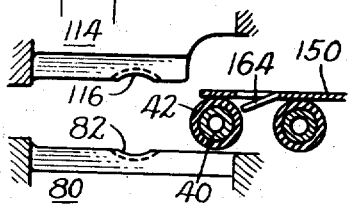
Figure 15b is a fragmentary vertical section taken at plane "B" of Figure 9 and showing the position of the inner pair of crimping jaws and detent when the tool is in the full line position of Figure 2.
Figure 15C:
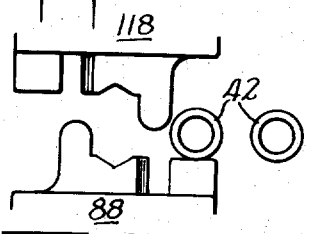
Figure 15c is a fragmentary vertical section taken at plane "C" of Figure 9 and showing the position of the outer crimping jaws and terminal strip when the tool is in the full line position of Figure 2.
Figure 16A:
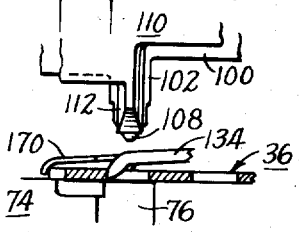
Figure 16B:
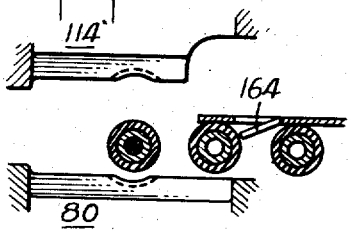
Figure 16C:
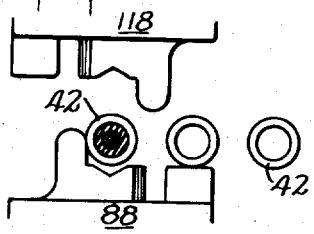
Figure 17A:
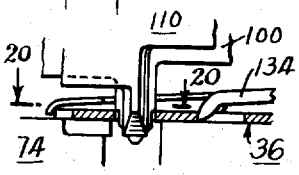
Figure 17B:
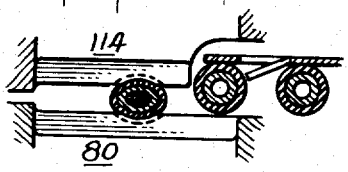
Figure 17C:
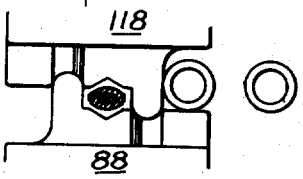
Figure 18A:
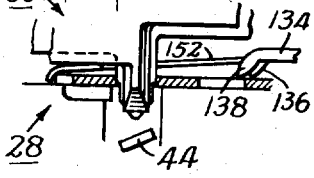
Figure 18B:
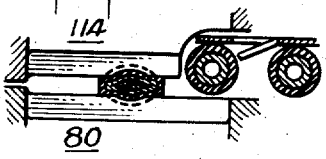
Figure 18C:
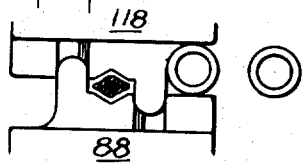
Figure 19:
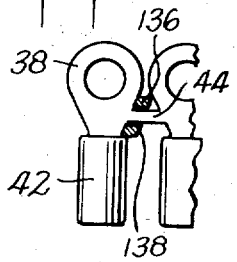
Figure 20:
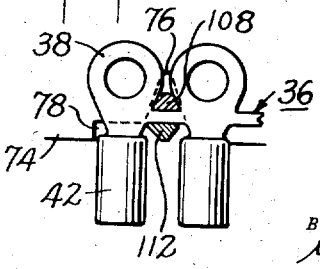

Figures 16a, 16b, and 16c are similar to 15a, 15b and 15c, respectively, but show the positions of the parts when the handles are fully open, i. e. in the dotted line position of Figure 2;

Figures 17a, 17b and 17c are similar to Figures 15a, 15b, and 15c, respectively, but show the positions of the parts when the handles have been closed approximately two-thirds of the way from their fully open position;

Figures 18a, 18b and 18c are similar, respectively, to Figures 15a, 15b and 15c but show the positions of the parts when the handles are fully closed and a connector has been crimped between the crimping jaws;

Figure 19 is a fragmentary horizontal section taken on the line 19—19 of Figure 15a and showing the location of the feed fingers in relation to the terminal strip during feeding of a terminal to the crimping jaws; and, Figure 20 is a fragmentary horizontal section taken on the line 20—20 of Figure 17a and showing the relative positions of the positioning mechanism and the leading terminals of the strip.

Figures 3, 4:
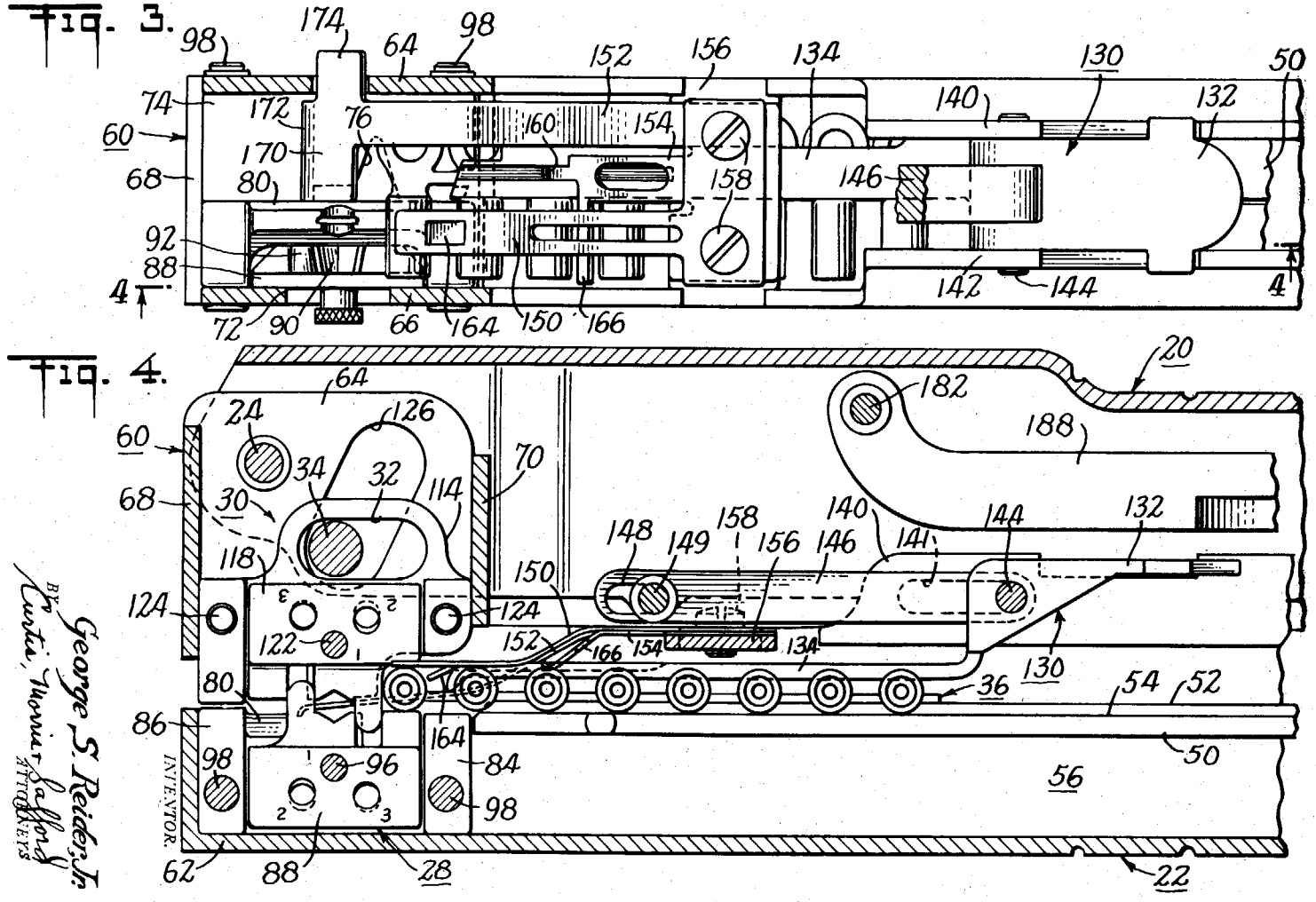
Figure 3 is a horizontal section taken on the line 3—3 of Figure 1 and showing portions of the terminal feed mechanism and the detent that prevents undesired retraction of the strip of terminals.
Figure 4 is a vertical section taken on the line 4—4 of Figure 3 and showing further details of the feed mechanism and detent and also the structure for reciprocating the upper crimping jaw assembly.

Referring to the drawings, and particularly to Figure 1, the tool there shown comprises generally a pair of handles 20, 22, pivotally connected at their left-hand ends by a pin 24. At the left-hand end of lower handle 22, and formed integrally therewith, is a crimping head 26 in which there are mounted a lower fixed crimping jaw assembly 28 and an upper vertically slidable crimping jaw assembly 30. Referring to Figure 4 as well as to Figure 1, the upper crimping jaw assembly 30 is provided with a horizontal slot 32 that is engaged by a pin 34 fixed to the upper handle 20. Thus as the handles 20 and 22 are opened and closed about pivot pin 24 the pin 34 cooperates with slot 32 of the upper crimping jaw assembly to give the upper assembly a straight line reciprocating movement with respect to the lower assembly 28.

Referring now to Figures 11 and 12 of the drawings, the terminals to be crimped between the jaws 28—30 are fed thereto in the form of a strip 36. While the present hand tool is not limited in its use to the particular type of terminal shown in Figures 11 and 12, the illustrated terminals are typical of those that can be crimped with advantage in this tool. The terminals shown comprise a ring portion 38 formed integrally with a metal ferrule or barrel 40 over which there is an insulating sleeve 42. The individual terminals are connected by connecting pieces 44 to form a strip.

In operating the tool, the handles are opened and the opening of the handles operates by mechanism described hereafter to advance the leading terminal of the strip 36 to a position between the crimping jaws 28 and 30. The stripped end of an insulated electrical conductor is then inserted in the ferrule 40 in such manner that a small amount of the insulation of the conductor is positioned within the insulating sleeve 42. Thereafter the handles are brought together to crimp the terminal to the end of the conductor. As shown in Figure 12, the terminal is crimped at two points, 46 and 48. The crimp 46 serves to crimp the metal ferrule 40 of the terminal to the bare end of the conductor and the crimp 48 serves to crimp the sleeve 42 to the insulated portion of the conductor.

Figure 8:
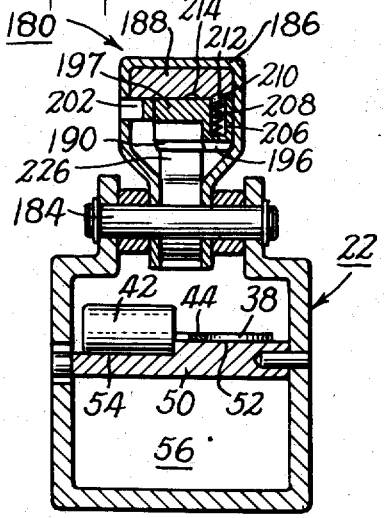
Figure 8 is a vertical section taken on the line 8—8 of Figure 6 and particularly showing details of the transversely movable rack section.

Reverting to Figure 1 and also referring to Figure 8 of the drawings, the lower handle 22 is of generally U-shaped cross-section and is provided with a longitudinal partition 50 which forms a track on which the strip 36 of terminals is adapted to ride. As shown in Figure 8, the track 50 has an upper level 52 on which the ring portions 38 of the terminals ride and a lower level 54 on which the sleeve portions 42 of the terminals ride. The track 50 cooperates with the lower part of handle 22 to provide a chamber 56 in which additional strips of terminals can be stored. As shown in Figure 1, the right hand end of handle 22 is provided with a removable pin 58 which extends across the end of chamber 56 to prevent the stored strips of terminals from slipping out of the handle until their removal is desired.

THE CRIMPING HEAD

Figure 9:
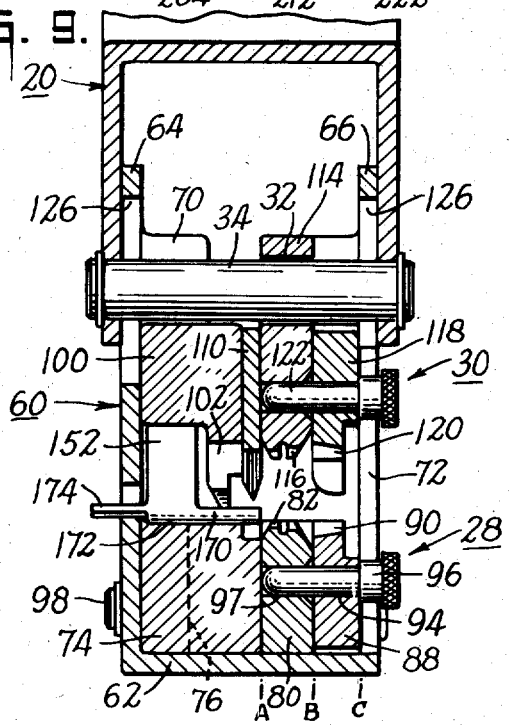
Figure 9 is a vertical section through the crimping head taken on the line 9—9 of Figure 2 and showing the crimping jaws and the terminal-positioning and severing mechanism.

The construction of the crimping head is best shown in Figures 3, 4, 9, 13, 14 and 14*a* of the drawings. Referring first to Figures 3, 4 and 9, the crimping head comprises a housing generally designated 60 and made up of a base plate 62, side plates 64 and 66 and end plates 68 and 70. The side 66 of crimping head is provided with a slot 72 which, as shown in Figures 1 and 2, exposes portions of the crimping assemblies and permits insertion of a conductor into a terminal that has been positioned between the crimping jaws.

As previously pointed out, the crimping head includes a lower crimping jaw assembly 28 and upper crimping jaw assembly 30, the parts of which are best shown in Figures 14 and 13, respectively, of the drawings. Referring first to Figure 14, the lower assembly comprises a generally rectanguloid anvil 74 having a vertical, substantially triangular slot 76 formed therein. Also formed in the anvil 74 at one side of slot 76 there is a small recess 78. As shown in Figure 14a, when a terminal is in crimping position its ring portion 38 lies on the upper surface of anvil 74 and the adjacent portion of the insulating sleeve 42 rests in the recess 78. Also the connecting piece 44 that connects the first and second terminals of the strips 36 lies across the top of slot 76. As described more fully below, when the upper crimping jaw assembly is lowered the terminal to be crimped is held firmly in the proper position against the anvil 74 and the connecting piece 44 is cut to sever the leading terminal from the strip.

Positioned next to the anvil 74 there is an inner lower crimping jaw 80 having a recessed die surface 82 formed in its upper surface. The ends 84 and 86 of crimping jaw 80 extend forwardly to provide a recess in which a second crimping jaw 88 (the insulation crimping jaw) is adapted to fit. The crimping jaw 88 is provided with a recessed die surface 90, a guide member 92 and a series of three holes 94 adapted to receive a pin 96 by means of which the jaws 80 and 88 can be secured together. The holes 94 of crimping jaw 88 are in approximate registry with the series of holes 97 in crimping jaw 80 but are located on slightly different centers so that the jaws 80 and 88 can be relatively adjusted by inserting the pin 96 in different but corresponding holes of the two crimping jaws. This construction permits the clearance between the insulation crimping jaws to be adjusted for different thicknesses of insulation on the conductor to be crimped. The crimping jaws 80 and 88 and anvil 74 which comprise the lower crimping jaw assembly 28 are fastened in the crimping head housing 60 by means of pins 98 which, as indicated in Figure 14 and also as shown in Figures 3 and 4 extend through holes in the anvil 74 and crimping jaw 80 and also through the side plates 64 and 66 of the housing 60. Thus the lower crimping jaw assembly 28 is held in fixed position in the housing 60. The assembled position of the assembly 28 is also shown in Figure 9 of the drawings.

Referring now to Figure 13, the upper crimping assembly comprises a terminal-positioning and severing member 100 having a downwardly extending shearing element 102 provided with shearing edges 104 and 106 that cooperate, when the crimping assembly is lowered, with the upper edges of slot 76 of anvil 74 to cut one of the connecting pieces 44 and thereby sever from the terminal strip 36 the terminal that is to be crimped. Integral with the shearing element 102 there is a positioning finger 108 that has a bevelled lower end and is of approximately triangular cross-section. The positioning finger 108 is shaped to conform with the inner upper edge of slot 76 of anvil 74, and as the upper assembly is lowered passes into the approximately triangular space between the rings 38 of adjacent terminals, thereby insuring proper positioning of the terminal that is to be crimped.

Next to the positioning member 100 there is a plate 110 provided with a downwardly extending positioning finger 112. As the upper assembly 30 is lowered the fingers 108—112 straddle the connecting piece 44 and enter slot 76 to insure proper positioning of the terminal strip and particularly of the leading terminal for crimping. The positions of the fingers 108 and 112 with respect to the terminal strip are particularly shown in Figure 20.

Next to the plate 110 there is an inner upper crimping jaw 114 which is provided with a recessed die surface 116 and a slot 32, previously described, which engages pin 34 of the upper handle and by means of which the upper assembly is actuated. The upper assembly 30 also includes an outer upper crimping jaw 118 which is provided with a die surface 120.

The crimping jaw 118 is secured to crimping jaw 114 by the pin 122 in the same manner that the jaws 80 and 88 are secured together by pin 96. The positioning member 100, plate 110 and crimping jaw 114 are held together by the pins 124 and the relative positions of these parts when assembled is illustrated in Figure 9.

As previously pointed out and shown in Figure 4, the pin 34, which is fixed to the upper handle 30, engages slot 32 in upper crimping jaw 114 and thereby causes the upper crimping assembly to move in a straight line reciprocating motion as the handles are opened and closed. The side plates 64 and 66 of the crimping head housing 60 are provided with slots 126 through which the pin 34 moves as the handles are operated.

FEED AND DETENT MECHANISM

The feed and detent mechanism are particularly shown in Figures 2, 3, 4, 10 and 11 of the drawing. Referring first to Figure 11, the feed mechanism includes a stepped lever 130 comprising a finger piece 132 and an elongated feed arm 134 terminating in a pair of fingers 136 and 138 that are adapted to straddle the connecting piece 44 between adjacent terminals of the strip 36. Figure 19 is a detailed view showing the location of the fingers 136 and 138 when they are positioned to engage the strip 36 preparatory to feeding a terminal into crimping position.

Referring to Figures 3 and 4, the lever 130 is pivotally mounted on the handle 22 in the following manner. The handle is provided with a pair of upstanding ears 140 and 142 containing horizontal slots 141, and the lever 130 is mounted by means of a pin 144 in these slots so that it can pivot about pin 144 and also move longitudinally in the slots. Pivotally connected to the center of pin 144 there is a feed-actuating lever 146 which (see Fig. 2) is pivotally connected at its upper end to the handle 20 by means of a pin 149. As shown in Figure 2, the upper end of lever 146 is provided with a slot 148 that is formed in the end of lever 146 and is engaged by the pin 149. Thus the slotted end of lever 146 and pin 149 provide a lost motion linkage and the arrangement of the parts is such that the handles can be separated to the full line position of Figure 2, i. e., the half-open position, before movement of handle 20 causes lever 146 to advance the feed lever 130. With this construction relative movement of handles 20 and 22 between the full-line position of Figure 2 and the closed position of Figure 1 produces no movement of the feed mechanism.

Referring now to Figure 10, there are shown in this figure three resilient strips which as indicated in Figure 10 are assembled on a plate 156 that is secured to the handle 22 by the screws 158. The assembled position of the resilient strips 150, 152, and 154 is shown in Figures 3 and 4. Still referring to Figure 10 and also to Figure 11, strip 154 is a hold-down spring for the feed lever 130 and has at its lower end a foot 160 adapted to ride in a groove 162 formed in the feed arm 134. Thus spring 154 tends to urge lever 130 in a counterclockwise direction, thereby urging fingers 136 and 138 into engagement with terminal strip 36. Strip 150 constitutes a detent for preventing undesired retraction of the terminal strip 36. It has at its lower end a downwardly extending struck out element 164 which, as best shown in Figure 4, extends downwardly between adjacent terminals and is resiliently biassed toward the terminal strip 36 to prevent retraction thereof when the feed mechanism is retracted. The function of the third resilient strip 152 will be described later.

The operation of the feed mechanism should be largely apparent from the foregoing description. As the handles 20 and 22 are separated from the closed position of Figure 1, the pivot 149 of handle 20 moves in slot 148 and no feeding movement of the feed mechanism occurs until the half-open position of the handles is reached. At this point further opening movement of the handle causes the feed-actuating lever 146 to advance the feed lever 130 along slots 141 and fingers 136 and 138 move the leading terminal of terminal strip 36 into crimping postion. During this advancing movement of the feed mechanism the detent 164 rides up over the second terminal of the strip 36. As the handles 20 and 22 are brought together pivot 149 rides along slot 148 during the first part of the closing movement and thereafter the feed lever 130 is retracted and fingers 136 and 138 ride over the next terminal of the strip. During this retraction of lever 130 the detent 164 prevents the terminal strip from being retracted.

At times it may be desirable to withdraw the terminal strip 36 from the tool before all the terminals have been crimped and this may be accomplished by manually depressing the finger piece 132 of feed lever 130 to rotate the lever clockwise and disengage fingers 136 and 138 from the terminal strip. As shown particularly in Figures 10 and 3, the hold-down spring 154 is provided with a laterally extending arm 166 that is positioned to engage the under side of detent strip 150. Hence, when lever 130 is rotated clockwise against the action of spring 154 by a manual depression of finger piece 132, the detent 164 is simultaneously lifted by arm 166 out of engagement with the terminal strip 36 and the terminal strip is then free to slide out of the handle 22.

Referring to Figure 10, the function of the strip 152 is to hold a severed terminal in place while it is being crimped. At its lower end the strip 152 is provided with a hold-down plate 170 terminating in a downwardly extending lip 172 and a laterally extending tab 174. As shown in Figures 3 and 4, the lower end of strip 152 extends into the crimping head and plate 170 is positioned opposite and in back of the crimping jaws. The tab 174 extends through the side plate 64 of the crimping head housing 60 and is adapted to be lifted manually to disengage the lower end of strip 152 from a terminal with which it is in contact. As shown in Figures 16a, 17a and 18a, when a terminal has been located in crimping position, its ring 38 engages the lip 172 of the strip 152 and hence this hold-down strip cooperates with the parts previously described to insure proper positioning of the terminal during crimping.

RATCHET MECHANISM

In a hand crimping tool of the general type here being described, it is undesirable, once the feeding of a terminal has started, to interrupt the operation of the tool until the crimping of the terminal on the conductor has been completed, since if the operation is interrupted an improperly crimped connection may be obtained. Accordingly mechanism is provided in the present tool which prevents removal of a partially crimped terminal from the tool, and makes it necessary for the operator to close the handles completely before the crimped terminal can be removed.

Referring to Figure 2 of the drawings, interconnecting the handles 20 and 22 there is a ratchet mechanism generally designated 180 that is pivotally connected to handle 20 by a pin 182 and pivotally connected to handle 22 by a pin 184. This ratchet mechanism, as will now be described, so controls the operation of the handles 20 and 22 that once the feeding of a terminal to crimping position has started, the handles must be moved first to the fully open position and then to the fully closed position before a crimped terminal can be removed from the device. Thus the production of an incompletely crimped connection is positively prevented. Also the construction of the ratchet mechanism 180 is such that the handle can be moved to a half-open position and then closed again without going through the fully open position and crimping a terminal. This partial opening movement of the handle is necessary to permit disengagement of the crimped terminal from the crimping jaws.

Figure 5:
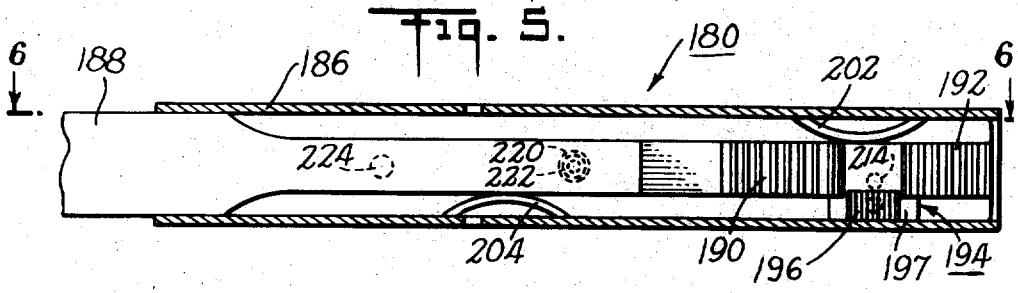
Figure 5 is a section taken on the line 5—5 of Figure 2 and showing the bottom of the rack of the ratchet mechanism that interconnects the handles of the tool.
Figure 6:
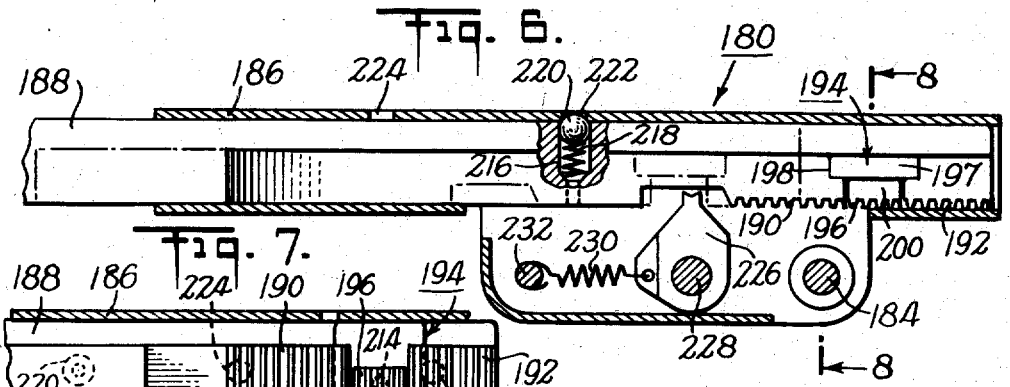
Figure 6 is a vertical section taken on the line 6—6 of Figure 5 and showing further details of the ratchet mechanism.
Figure 7:
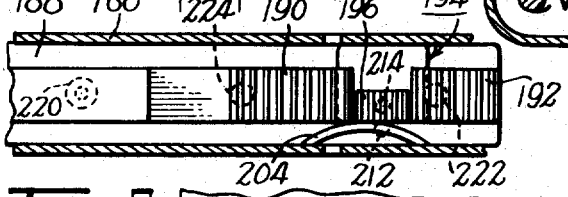
Figure 7 is a fragmentary view similar to Figure 5 but showing the rack in a different position than in Figure 5.

The construction of ratchet mechanism 180 is best shown in Figures 5 through 8 of the drawings. Referring first to Figure 5, the ratchet mechanism comprises a tubular housing 186 and a rack bar 188 constructed to telescope with the housing and provided, within the housing, with two spaced racks 190 and 192. Located between the racks 190 and 192 and mounted in the rack bar 188 for transverse sliding movement there is a rack member 194 having a relatively narrow rack 196 formed thereon. As shown in Figure 6, the rack member 194 comprises a rectanguloid block 197 transversely slidable in a slot 198 of rack bar 188 and having a depending rack support 200 of reduced diameter on the lower surface of which the rack 196 is formed. Reverting to Figure 5, transverse movement of the rack member 194 is effected by means of a pair of bosses 202 and 204 formed on the inner surface of housing 186. The boss 202 guides rack member 194 in a direction to move rack 196 out of alignment with racks 190 and 192 and the boss 204 guides rack member 194 in a direction to bring rack 196 into alignment with racks 190 and 192.

As shown in Figure 8, detents are provided for retaining the rack member 194 in the terminal positions of its travel. Formed in the rack member 194 there is a well 206 containing a coil spring 208 that bears against the under side of a sphere 210 located at the open end of the well. Formed on the under side of rack bar 188 there are a pair of spaced recesses 212 and 214 positioned to cooperate with the sphere 210 to retain rack member 194 in one of its two operative positions until it is forced into the other position by one of the bosses 202 and 204. More specifically, when the rack member 194 is in the position shown in Figure 5, the sphere 210 is urged into recess 212 to hold the rack member in this position, whereas when the rack member 194 is in the position shown in Figure 7 the sphere 210 cooperates with recess 214 to hold the rack member 194 in the position of Figure 7.

Referring now to Figure 6, formed in the rack bar 188 there is a well 216 containing a coil spring 218 that bears against a sphere 220 located at the open end of the well. The sphere 220 is positioned to cooperate with one of two openings 222 and 224 formed in the top of housing 186. The spring 218 and sphere 220 cooperate with the opening 222 to tend to maintain the handles in closed position and the spring and sphere cooperate with hole 224 to tend to maintain the handles in half-open position.

Still referring to Figure 6, mounted in the lower portion of housing 186 there is a pawl 226 secured to a shaft 228 that is pivotally mounted in the housing. The pawl 226 is urged toward a vertical neutral position by a spring 230 which is normally under tension and is secured to a pin 232 fixed to the housing.

The operation of the ratchet mechanism is as follows: When the tool is in closed position with the handles together the rack bar 188 and rack member 194 are located as shown in Figures 5 and 6. As the handles are opened rack bar 188 is gradually withdrawn from housing 186 and as this opening movement of the handles begins rack 190 engages pawl 226. After engagement of rack 190 with pawl 226, the opening movement of the handle must be continued until the rack 190 has passed pawl 226 and the pawl is opposite, but not engaged with, rack 196. At this point the handles are in half-open position and the movement of the handles can be reversed, that is to say, the handles can be again closed. If, however, the opening movement of the handles is continued rack 192 engages the pawl 226 and opening movement of the handles must be continued until the rack 192 passes pawl 226. However, before this occurs rack member 194 is engaged by boss 204 and rack 196 is moved into alignment with racks 190 and 192. Thus when closing movement of the handles starts from the fully open position, the racks 190, 196 and 192 form a continuous rack engageable with the pawl 226, and hence the handles must be moved to a fully closed position before they can be opened again. It may be noted that when the handles are closed from fully open position, the lost motion linkage 148—149 ensures the pawl 226 will engage rack 190 before any retractive movement of the feed mechanism occurs and thus double feeding of terminals to the crimping jaws is positively prevented.

The general mode of operation of the present hand tool should be apparent from the foregoing description.

The operation of the crimping mechanism is particularly illustrated in Figures 15 to 18. Figures 15a, 15b and 15c illustrate the positions of the parts when the tool is in half-open position, i. e., the full line position of Figure 2. In this position no terminal has yet been fed to crimping position, the positioning fingers 108 and 112 are above the top of anvil 74 and the feed arm 134 is in its lower position with feed fingers 136 and 138 engaging the leading terminal of the strip. Figure 15b shows that the inner crimping jaws are partly separated and the detent 164 is positioned between the first and second terminals of the strip. Figure 15c shows that the outer crimping jaws are partly separated without any terminal therebetween.

Figures 16a, 16b and 16c show the position of the parts when the handles are fully open. The feed arm 134 has moved a terminal into crimping position and the ferrule or barrel of the terminal is aligned with the two sets of crimping jaws ready to be crimped.

Figures 17a, 17b and 17c illustrate the position of the parts when the handles are about two thirds closed. The upper jaw assembly 30 has been lowered to the point where the positioning fingers 108 and 112 straddle the connecting piece 44 between the first and second terminal of the strip, and the shearing edges 104 and 106 are about to sever the connecting piece from the adjacent terminals. Feed arm 134 has been retracted to cause the feed fingers to engage the second terminal of the strip. Figures 17b and 17c show that the inner and outer crimping jaws are beginning to crimp the terminal.

Figures 18a, 18b and 18c show the position of the parts when the handles are in fully closed position. The connecting piece 44 has been completely severed from the terminal strip and the feed arm 134 has been withdrawn to its fully retracted position. Figures 18b and 18c illustrate the fully closed positions of the inner and outer jaws, respectively and the crimped condition of the terminal therebetween. The appearance of the crimped connection after removal from the tool is illustrated in Figure 12.

From the foregoing description it should be apparent that the present invention provides a hand tool capable of accomplishing the several objectives set forth at the beginning of the present specification. Accurate positioning of the terminal at its crimping location is insured by the various positioning devices described and a positive feeding mechanism is provided for feeding the terminals successively to the crimping position. The ratchet mechanism effectively controls operation of the tool, on the one hand, to prevent incomplete crimping of a terminal and, on the other hand, to permit a sufficient opening of the tool to allow ready removal of a crimped terminal and subsequent closing of the tool without feeding of another terminal for crimping. The location of the crimping jaws with respect to the handles and their pivotal connection and the mode of connection of the crimping jaws to the handles provide both effective multiplication of the manual force applied to the tool and precisely linear relative movement of the crimping jaws.

Since many embodiments might be made of the present invention and since many changes might be made in the embodiment disclosed herein, it is to be understood that the foregoing description is to be interpreted as illustrative only and not in a limiting sense.

I claim:

1. A hand tool for crimping electrical connectors comprising, in combination, a pair of pivoted handles, a pair of cooperating relatively movable crimping jaws respectively connected to said handles for movement of said handles toward or away from each other to cause corresponding movement of said crimping jaws and a ratchet mechanism interconnecting said handles, said ratchet mechanism including a rack connected to one handle and a housing connected to the other handle and telescoping with said rack, said housing having a reversible pawl mounted therein to cooperate with said rack, a disalignable section on said rack for disengaging said rack from said pawl upon disalignment and movement of said handles and jaws to an intermediate connector releasing position, and means operative upon movement of said handles from said intermediate position to opened and closed position respectively to align and disalign said section.

2. A hand tool according to claim 1 and wherein said last named means comprises a pair of spaced bosses formed in the walls of said housing.

3. A hand tool for crimping electrical connectors comprising, in combination, a pair of pivoted handles, a pair of relatively movable crimping jaws effectively connected to said handles for relative movement toward and away from each other as said handles are pivoted, a track formed in one of said handles for supporting a strip of connectors to be crimped, and feed mechanism mounted on said one handle for sliding movement therealong, said feed mechanism having a part adapted to engage said strip of connectors and including a lever pivoted at one end to said part and at the other end pivotally connected by a lost motion linkage to the other handle, whereby as said handles are separated said feed mechanism is advanced after a predetermined delay to move said strip of connectors toward said crimping jaws.

4. A hand tool for crimping electrical connectors comprising, in combination, a pair of pivoted handles, a pair of relatively movable crimping jaws effectively connected to said handles for relative movement toward and away from each other as said handles are pivoted, means associated with one of said handles for mounting a series of connectors to be crimped and feeding them successively to a crimping position between said crimping jaws, and a ratchet mechanism inter-connecting said handles, said ratchet mechanism including a rack connected to one handle and a housing connected to the other handle and telescoping with said rack, said housing having a reversible pawl mounted therein to cooperate with said rack, a disalignable section on said rack for disengaging said rack from said pawl upon disalignment and movement of said handles and jaws to an intermediate connector releasing position, and means operative upon movement of said handles from said intermediate position to opened and closed position respectively to align and disalign said section.

5. A hand tool for crimping electrical connectors comprising, in combination, a pair of pivoted handles, a pair of relatively movable crimping jaws effectively connected to said handles for relative movement toward and away from each other as said handles are pivoted, means associated with one of said handles for mounting a strip of connectors to be crimped and feeding them to a crimping position between said crimping jaws, and a ratchet mechanism interconnecting said handles, said ratchet mechanism including a rack pivotally connected to one handle and a housing pivotally connected to the other handle and telescoping with said rack, said housing having a pawl mounted therein to cooperate with said rack and said rack having a laterally movable section slidably mounted therein substantially midway between its ends for disengaging said rack and pawl upon movement of said handles and jaws to an intermediate connector releasing position, said housing being provided with a pair of spaced bosses positioned to engage opposite ends of said laterally movable section to move it into and out of alignment with said pawl upon movement of said handles from said intermediate position to opened and closed positions respectively.

6. A hand tool according to claim 5 and wherein said laterally movable section is provided with a spring-biased detent and said rack is provided with a pair of spaced recesses adapted to cooperate with said detent to restrain said laterally movable section at the terminal positions of its travel.

7. A hand tool for crimping electrical connectors comprising, in combination, a first handle having a crimping head at one end thereof, a second handle pivotally connected to said head, a first crimping jaw assembly mounted in fixed relation to said head, a second crimping jaw assembly mounted in said head for sliding reciprocatory motion with respect to said first assembly, said second assembly being connected to said second handle to cause pivoting of said handle to produce relative movement of said crimping jaw assembly, means associated with one of said handles for mounting a strip of interconnected terminals, feed mechanism slidably mounted on said one handle, said feed mechanism having a feed arm adapted to engage said strip of connectors and including a pivoted actuating lever pivotally connected by a lost motion linkage to the other handle so as to delay the movement of said mechanism upon movement of said handles, said first assembly including at least one crimping die and a slotted anvil and said second assembly including at least one crimping die positioned to cooperate with the crimping die of said first assembly, and a shearing member positioned to cooperate with said slot of said anvil to sever from said strip the terminal that is in crimping position.

8. A hand tool according to claim 7 and wherein said second assembly includes a pair of locating fingers adapted to engage said strip of terminals to insure proper positioning of the terminal in crimping position before it is severed and crimped.

9. A hand tool according to claim 7 and including a spring-biased holding member mounted on said one handle and positioned to bear resiliently against the terminal in crimping position to hold it while it is beng crimped.

10. A hand tool for crimping electrical connectors comprising, in combination, a first handle having a crimping head at one end thereof, a second handle pivotally connected to said head, a first crimping jaw assembly mounted in fixed relation to said head, a second crimping jaw assembly mounted in said head for sliding reciprocatory motion with respect to said first assembly, said second assembly being connected to said second handle to cause pivoting of said handle to produce relative movement of said crimping jaw assembly, and means associated with one of said handles for mounting a strip of interconnected terminals and feeding them successively to a crimping position between said crimping jaw assembly, each of said crimping jaw assemblies including two crimping dies with one pair of cooperating crimping dies being adjustable with respect to the other pair of cooperating crimping dies, said first assembly including a slotted anvil, and a shearing member positioned to cooperate with the slot of said anvil to sever from said strip the terminal that is in crimping position.

11. A hand tool for crimping electrical connectors comprising a pair of pivoted handles, a pair of relatively movable crimping jaws effectively connected to said handles for relative movement thereby upon pivotal movement of said handles, reversible full-stroke compelling means interconnected with said handles, means rendering said full-stroke compelling means reversible over an intermediate connector-releasing increment of the jaw-opening stroke of said handles, means associated with one of said handles for mounting a series of connectors to be crimped, and means coupled to said handles operative upon opening said handles past said intermediate increment to feed one of the connectors to crimping position between said jaws.

12. A hand tool substantially as set forth in claim 11 wherein said last-named means comprises a feed mechanism having a feed finger mounted for sliding reciprocatory movement on said one handle and an actuating lever therefor pivotally coupled between said handles whereby opening and closing of said handles causes said finger to feed and retract respectively, said lever having a lost motion coupling with one of said handles for delaying retraction of said feed finger in the closing stroke of said handles.

13. A hand tool for crimping electrical connectors comprising a pair of pivoted handles, a pair of relatively movable crimping jaws effectively connected to said handles for relative movement thereby upon pivotal movement of said handles, a reversible ratchet mechanism interconnected with said handles for compelling full strokes thereof, means rendering said mechanism reversible over an intermediate connector-releasing increment of the jaw-opening stroke of said handles, means yieldably retaining said mechanism within said increment, means associated with one of said handles for mounting a series of connectors to be crimped, and means coupled to said handles operative upon opening said handles past said intermediate increment to feed one of said connectors to crimping position between said jaws.

14. A hand tool for crimping electrical connectors comprising a pair of pivoted handles, a pair of relatively movable crimping jaws and severing dies effectively connected to said handles for relative movement thereby upon pivotal movement of said handles, means associated with one of said handles for mounting a series of connectors in strip form to be crimped, means for feeding said connectors successively to said crimping jaws, and locator finger means having beveled leading end surfaces and rigidly connected for movement with said crimping jaws and disposed between said jaws and feeding means in position to engage the strip between the leading and next succeeding connector when the leading connector is in approximate crimping position between said jaws, said finger means projecting in advance of said crimping jaws and severing dies and adapted positively to cam the leading connector of the series accurately into position for severing detachment from the strip and crimping in the operative stroke of said handles.

15. A hand tool for crimping electrical connectors comprising, in combination, a pair of handles pivotally connected near one end, a pair of cooperating crimping jaws located between the pivotal connection of said handles and the free ends thereof, one of said crimping jaws being respectively connected to each of said handles whereby as said handles are moved toward each other said crimping jaws are brought together to crimp a connector placed therebetween, a track formed in one of said handles for supporting a strip of terminals to be crimped, feed mechanism including a pivoted feed arm adapted to engage said strip, a detent positioned to engage said strip to prevent retraction thereof when said feed mechanism is retracted, first spring means for biasing said feed arm into engagement with said strip, second spring means for biasing said detent into engagement with said strip, and means for interconnecting said first and second spring means whereby said feed arm can be pivoted to disengage said arm and detent from said strip simultaneously to permit withdrawal of said strip from said tool.

16. A hand tool substantially as set forth in claim 11 wherein said last-named means comprises a feed mechanism having a feed finger mounted for sliding reciprocatory movement on said one handle and an actuating lever therefor pivotally coupled between said handles whereby opening and closing of said handles causes said finger to feed and retract respectively, said lever including means for delaying retraction of said feed finger in the closing stroke of said handles and for delaying said feeding stroke of said finger until said handles are beyond said connector-releasing increment in the opening stroke thereof.

17. A hand tool for crimping electrical connectors comprising, in combination, a pair of pivoted handles, a pair of relatively movable crimping jaws effectively connected to said handles for relative movement toward and away from each other as said handles are pivoted, a track formed in one of said handles for supporting a strip of said connectors to be crimped, feed mechanism mounted on said one handle for sliding reciprocatory movement therealong, said feed mechanism including a pivotally connected feed lever and an actuating lever, said feed lever having one arm adapted to engage said strip of connectors and a second arm adapted to be manually depressed to pivot said feed lever about the pivotal connection with said actuating lever for disengaging said feed lever from said strip of connectors, said actuating lever being pivotally connected to said other handle, whereby as said handles are opened said feed mechanism advances said strip of connectors toward said crimping jaws, spring means for resiliently urging said feed lever into engagement with said strip of connectors, and a spring biased detent mounted on said one handle and biased to engage said strip of connectors to prevent withdrawal thereof when said feed mechanism is retracted by closing of said handles, said detent and said feed lever being interconnected for simultaneous disengagement from said strip upon depression of said second arm.

*18. A device for securing articles to wires, comprising a plurality of cooperative members for engaging portions of an article to crimp it onto a wire, means for actuating the members, means controlled by said actuating means for feeding the articles one at a time into crimping position, and means mounted on one of the cooperating members for holding the article in crimping position as said members are actuated.*

*19. A device for securing articles to wires, comprising a pair of jaws having cooperating surfaces for engaging portions of an article to crimp it onto a wire, means for actuating the jaws, means for feeding the articles one at a time into position between said jaws, and means carried by one jaw for holding the article between the jaws as they are moved together to crimp said article.*

References Cited in the file of this patent or the original patent

UNITED STATES PATENTS

| | | |
|---|---|---|
| 487,346 | Cheeseman | Dec. 6, 1892 |
| 597,740 | Pusey | Jan. 25, 1898 |
| 1,485,328 | Brooks | Feb. 26, 1924 |
| 1,677,365 | Peck | July 17, 1928 |
| 2,359,083 | Carlson | Sept. 26, 1944 |
| 2,411,838 | Swengel | Nov. 26, 1946 |
| 2,587,096 | Berger | Feb. 26, 1952 |
| 2,612,932 | Vinson | Oct. 7, 1952 |
| 2,618,993 | Carlson | Nov. 25, 1952 |
| 2,627,769 | Anderson et al. | Feb. 10, 1953 |
| 2,812,676 | Brown | Nov. 12, 1957 |

FOREIGN PATENTS

| | | |
|---|---|---|
| 597,178 | Germany | May 18, 1934 |